United States Patent

Osawa et al.

Patent Number: 5,848,067
Date of Patent: Dec. 8, 1998

[54] AAL1 PROCESSING METHOD AND APPARATUS FOR PARALLELLY EXECUTING SEQUENCE NUMBER PROCESSING AND POINTER COMPARISON PROCESSING IN ATM CELL DISASSEMBLY APPARATUS

[75] Inventors: Takahiro Osawa, Higashimurayama; Katsuyoshi Tanaka, Tokyo; Masaru Murakami, Yokohama, all of Japan

[73] Assignees: Hitachi, Ltd.; Hitachi ULSI Engineering Corporation, both of Tokyo, Japan

[21] Appl. No.: 813,357

[22] Filed: Mar. 7, 1997

[30] Foreign Application Priority Data

Mar. 8, 1996 [JP] Japan ................................ 8-051499

[51] Int. Cl.$^6$ .............................. H04L 12/28; H04L 12/56
[52] U.S. Cl. ........................ 370/394; 370/352; 370/395; 370/466; 370/517
[58] Field of Search ...................................... 370/394, 466, 370/470, 476, 517, 395, 351, 352, 353, 354, 355, 356, 357, 465

[56] References Cited

U.S. PATENT DOCUMENTS

| | | | |
|---|---|---|---|
| 5,343,462 | 8/1994 | Sekihata et al. | 370/355 |
| 5,541,926 | 7/1996 | Saito et al. | 370/94.2 |
| 5,742,600 | 4/1998 | Nishihara | 370/517 |

Primary Examiner—Michael Horabik
Assistant Examiner—Timothy Edwards, Jr.
Attorney, Agent, or Firm—Antonelli, Terry, Stout & Kraus, LLP

[57] ABSTRACT

An AAL1 processing method in a cell disassembly apparatus for performing pointer comparison processing on the assumption that a pointer is inserted in each ATM cell, in parallel with sequence number processing, to determine the validity of the result of the pointer comparison processing to control an output data stream. In this case, data associated with each connection required for each processing is read from a memory table based on connection information added to a received ATM cell each time the ATM cell is received, and set in corresponding processing units.

14 Claims, 10 Drawing Sheets

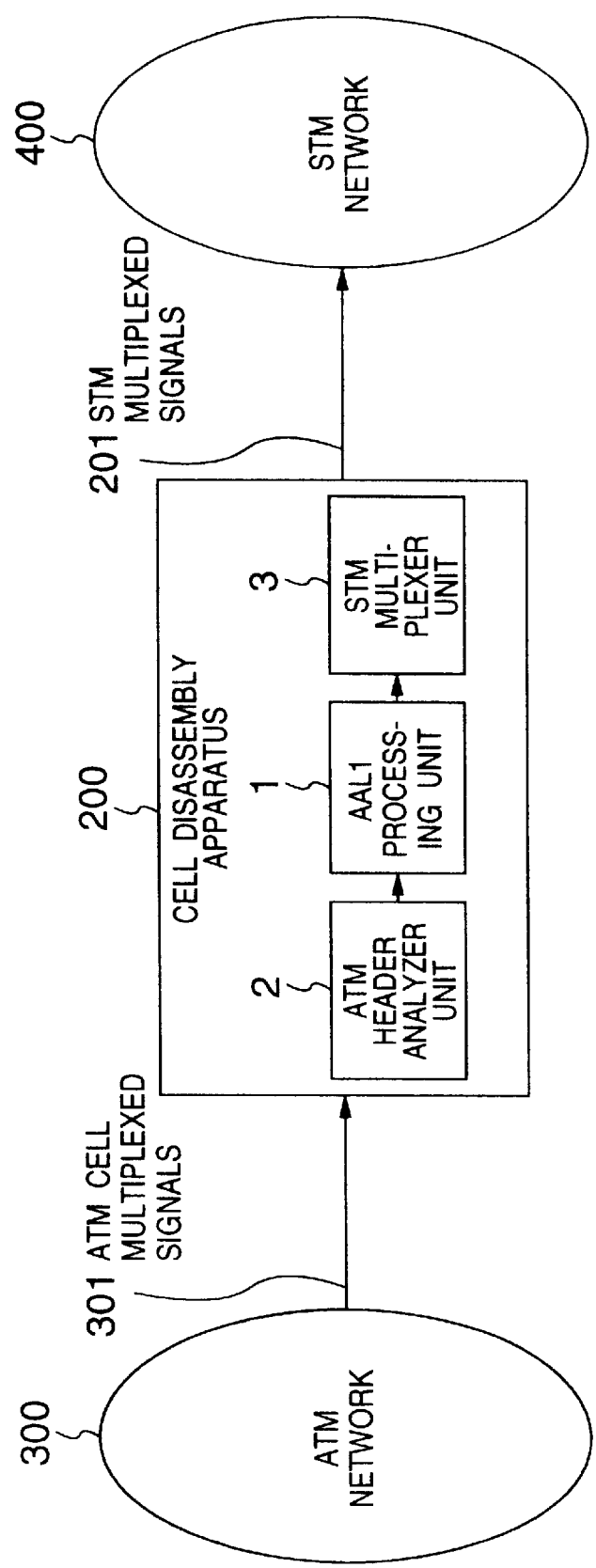

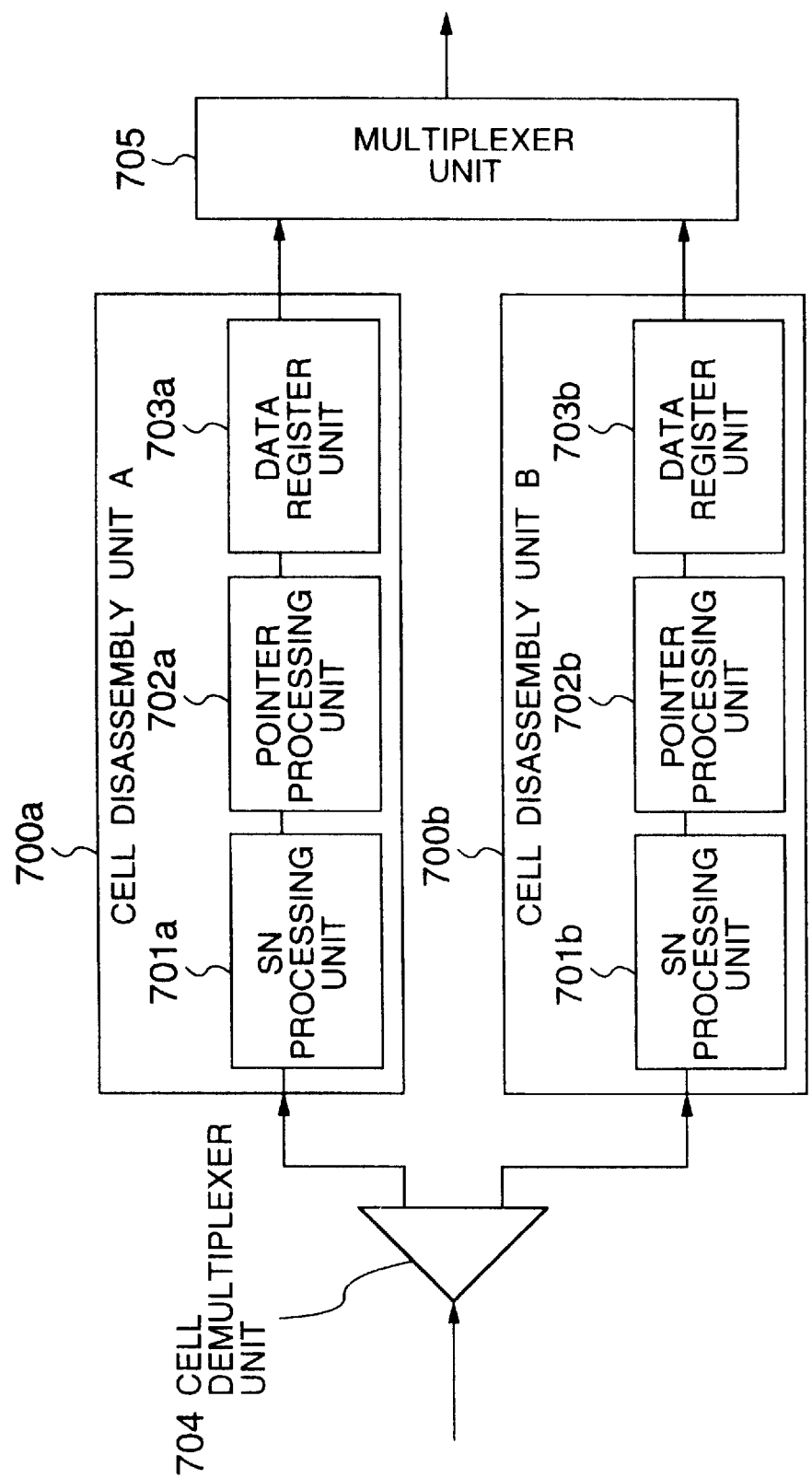

5,848,067

AAL1 PROCESSING METHOD AND APPARATUS FOR PARALLELLY EXECUTING SEQUENCE NUMBER PROCESSING AND POINTER COMPARISON PROCESSING IN ATM CELL DISASSEMBLY APPARATUS

BACKGROUND OF THE INVENTION

The present invention relates to an AAL1 (ATM Adaptation Layer 1) processing method and apparatus for executing a part of processing executed in a cell disassembly apparatus for transforming ATM cell multiplex signals from an ATM (Asynchronous Transfer Mode) network into STM (Synchronous Transfer Mode) multiplex signals to transfer same to a STM network. In particular, the present invention relates to an AAL1 processing method and apparatus which are capable of executing the AAL1 processing while accommodating a plurality of connections with a reduced cell disassembly delay on common hardware.

As the ATM technology has been established, a need is increasingly arising for utilizing the ATM technology to similarly provide faster relay and transmission of frame structured data multiplexed with low speed connection data. The type of AAL for transforming frame structured fixed rate data into ATM cells for transmission is defined as "type 1" by ITU-T Recommendation. The transformation and transmission of cells require sequence number (SN) processing and pointer processing.

The SN processing herein referred to is the processing executed when STM frames are transformed into ATM cells on an ATM cell transmitting side (in a cell assembly apparatus) for inserting a sequence number into a predetermined portion of each of ATM cells. The sequence numbers thus inserted into the respective ATM cells permit an ATM cell receiving side (a cell disassembly apparatus) to detect ATM cell losses and/or misinsertion by monitoring whether or not the continuity is maintained in the SN's inserted in the respective received ATM cells when STM frames are reassembled from each of the received ATM cells.

The pointer processing, in turn, means the processing executed when STM frames are transformed into ATM cells on the ATM cell transmitting side for inserting data indicative of a boundary position of a STM frame (frame head position) into a predetermined ATM cell as a pointer. The inserted pointers are extracted from respective received ATM cells when STM frames are reassembled from the received ATM cells. Specifically, the extracted pointers are relied on to detect boundary positions of STM frames and then reassemble the STM frames, thereby establishing the frame synchronization.

Now, the relationship between a cell disassembly apparatus, an ATM network, and a STM network is illustrated in FIG. 7. As illustrated, an ATM cell multiplex signal 301 from an ATM network 300 is transformed into a STM multiple signal 201 by a cell disassembly apparatus 200, and the STM multiplex signal 201 is transferred to a STM network 400. In the cell disassembly apparatus 200, an ATM header analyzer unit 2 converts an ATM header included in the ATM cell multiplex signal 301 into a connection number which corresponds to the ATM header, and then an AAL1 processing unit executes AAL type 1 processing corresponding to the connection number to monitor for ATM cell losses and/or misinsertion, take countermeasures to lost cells and misinserted cells, and recognize the frame head. As a result of the processing, user data outputted from the AAL1 processing unit 1 to a STM multiplexer unit 3 is temporarily stored in the STM multiplexer unit 3 in a state in which the user data is separated for each connection. Then, the user data is sequentially read therefrom in byte by byte and outputted to the STM network 400 as STM multiplexed data.

For reference, FIGS. 8A, 8B illustrate an example of how a STM frame is transformed into ATM cells in a cell assembly apparatus, and FIG. 9 illustrates a format for the ATM cell. As illustrated in FIGS. 8A, 8B, data in a STM frame whose length is fixed is segmented into a 46-byte (FIG. 9) or 47-byte block and inserted into an ATM payload. Sequence numbers 0–7 are cyclically assigned to ATM cells independently of each other. As illustrated in FIG. 9, the ATM cell is basically composed of a 5-byte ATM header and a 48-byte payload.

In the payload, data corresponding to the first byte location is allocated to an AAL1 header 610, and a pointer 612 is inserted into the next byte location as required. The pointer 612 contains data indicative of the head position of an associated STM frame. Thus, the payload contains 46-byte user data 615 when the pointer 612 is inserted therein and 47-byte user data when the pointer 612 is not inserted therein.

In the cell assembly apparatus, when a STM data stream 800 is transformed into ATM cells, i.e., segmented into ATM cells, a sequence number 613 indicating one of "0"–"7" is added in the 8-bit AAL1 header 610 as 3-bit data. When a CSI 614 indicative of the presence or absence of the pointer in an associated ATM cell is "1", it indicates that the pointer 612 is inserted in the ATM cell for indicating the existence of a frame head 611 therein. However, it is only in one ATM cell having an even-numbered SN within eight ATM cells that the CSI 614 is set at "1".

In the pointer 612, 7-bit data is written for indicating the location at which the frame head 611 is stored within a data block (having 93 bytes) composed of a unit set of an even-numbered SN cell and an odd-numbered SN cell. Specifically, the 7-bit data indicates the number of bytes which exists from the location of the frame head 611 to the byte location at which the pointer 612 is inserted.

An AAL1 processing apparatus as a component of a cell disassembly apparatus has been so far known, for example, by JP-A-7-99493. Explaining the prior art AAL1 processing apparatus with reference to FIG. 10, ATM cell multiplex signals from an ATM network is first inputted to a cell demultiplexer unit 704 to separate ATM cells for each connection, i.e., for each type of ATM header, and the separated cells are applied to cell disassembly units 700a, 700b according to ATM header. FIG. 10 illustrates that the AAL1 processing apparatus is adapted to two connections.

In each of the cell disassembly units 700a, 700b, after an AAL1 header of a received ATM cell is extracted by each of SN processing units 701a, 701b, a sequence number is checked bit errors in the sequential number itself and ATM cell loss and/or misinsertion. From each of ATM cells from which no faults have been detected in the SN processing, the frame head indicated by a pointer is recognized in each of subsequent pointer processing units 702a, 702b. Then, data in the ATM cell are temporarily held in each of data register units 703a, 703b with the frame head position being recognized. The data held in this manner is multiplexed by a multiplexer unit 705 and outputted to a STM network as multiplexed data.

However, when a plurality of connections are to be accommodated using the AAL1 processing apparatus described in the aforementioned JP-A-7-99493, the same hardware such as the cell disassembly units 700a, 700b must be provided for each connection. In addition, a plurality of connections must be processed in a multiplex manner on the same hardware, thereby inevitably increasing the scale of the associated hardware. Furthermore, for actual service operations, each connection must support arbitrary speeds and also cope with variations and bursts during ATM cell transmission. Additionally, a large number of processing required to accommodate a plurality of connections causes an increase in cell disassembly delay when ATM cells are reassembled into frame structured data, so that a large transmission delay will be generated. Furthermore, since the processing of a plurality of connections requires control parameters or status parameters to be held for each processing executed for each connection, the processing control becomes inevitably complicated.

SUMMARY OF THE INVENTION

It is an object of the present invention to provide an AAL1 processing method and apparatus which are capable of executing AAL1 processing that reduces a cell disassembly delay on shared hardware and facilitates a processing control even when a plurality of connections are accommodated in an ATM cell disassembly apparatus.

To achieve the above object, the AAL1 processing apparatus according to the present invention executes the processing in units of one ATM cell time. To complete the processing within one ATM cell time to reduce a delay, a sequence number (SN) processing unit and a pointer comparator unit for improving the reliability of frame synchronization, which have conventionally operated in series, are configured to operate in parallel.

In this event, although a pointer is actually inserted only in one of eight cells such as a cell having a sequence number 2 within cells having sequence numbers 0–7 in FIG. 3, the pointer comparison processing is executed on the assumption that a pointer is inserted in all the ATM cells. A determination unit utilizes an established SN value derived by a SN processing unit and the value of a CSI bit, the comparison result derived from the pointer comparator unit, and a status parameter such as a predicted SN value indicative of a processing situation of an associated connection for which the processing is to be executed, to classify received cells into a normal cell having an even-numbered SN classify, a cell having an odd-numbered SN, and a case in which a cell having an even-numbered SN is lost, and the validity of the result of the comparison processing which has been executed on the assumption that the pointer is inserted in all the ATM cells is determined. When a cell having an even-numbered SN is lost, since it can be considered that the cell lost has a pointer, whether or not the pointer is present in the cell lost is determined in the determination unit. If it is determined that the cell lost has a pointer inserted, the cell determined to be lost is inserted in an output control unit as a dummy cell. Namely, based on the result of determination made by the determination unit, the output control unit outputs the dummy cell and a pointer signal. When a cell having an odd-numbered SN is lost, a dummy cell is automatically inserted in the output control unit. The output of data and frame head signal are controlled based on the result of determination made by the determination unit.

In addition, the status parameter used for controlling the processing in the SN processing unit and the determination unit is held on a shared memory in units of one byte/word in such a manner that the status parameter can be updated, thereby facilitating the control of the processing for each connection.

The configuration as described above, according to the present invention, enables cells having different connection information (connection number) received in a time division manner to be processed by the same hardware. More specifically, every time a received cell has a different connection number, a status parameter corresponding to the connection number is read from a table and set in each processing unit to change the status thereof in a time division manner as if cells having the same connection number are being sequentially processed. For example, when a cell having connection information "N" has been processed, a status parameter upon the completion of the processing is stored in a table of a status parameter register unit as a status parameter corresponding to the connection information "N". Next, when a cell having connection information "N+1" is received, a status parameter corresponding to the connection information "N+1" stored when the preceding cell having the connection number "N+1" was processed is set in each processing unit to process the cell having the connection information "N+1". Then, the status parameter corresponding to the connection information "N+1" is updated with a new status parameter. When a cell having the connection information "N" is again received at a later time, the status parameter corresponding to the connection information "N" stored when the preceding cell having the connection information "N" was processed is set in each processing unit, so that the cell having the connection information "N" is processed in the set status.

In this event, for normally processing the first ATM cell received after a connection is established, an SN processing initialization flag and a pointer processing initialization flag are provided as part of the status parameter for each connection. When the SN processing initialization flag is set, a sequence number of the received ATM cell is forcedly held for determining a sequence number of an ATM cell to be next received. When the pointer processing initialization flag is set, a pointer inserted in a received ATM cell is forcedly loaded into a down counter for counting a frame length.

It will be appreciated from the foregoing that the present invention provides an AAL1 processing method and apparatus which can achieve the AAL1 processing that is easy to control and reduces a delay due to cell disassembly on shared hardware, even when a plurality of connections are accommodated in a single ATM cell disassembly apparatus.

BRIEF DESCRIPTION OF THE DRAWINGS

FIG. 7 is a block diagram generally illustrating a relationship between a cell disassembly apparatus, an ATM network, and a STM network;

FIG. 10 is a block diagram illustrating an example of a prior art AAL1 processing apparatus.

DESCRIPTION OF THE PREFERRED EMBODIMENTS

An embodiment of the present invention will hereinafter be described with reference to FIGS. 1 through 6.

First, an AAL1 processing apparatus of the invention, serving as a component of the aforementioned cell disassembly apparatus, will be described with reference to FIG. 1 which illustrates the configuration thereof in a block diagram form and FIG. 2 which illustrates operation timing of the entire apparatus.

Figure 1:
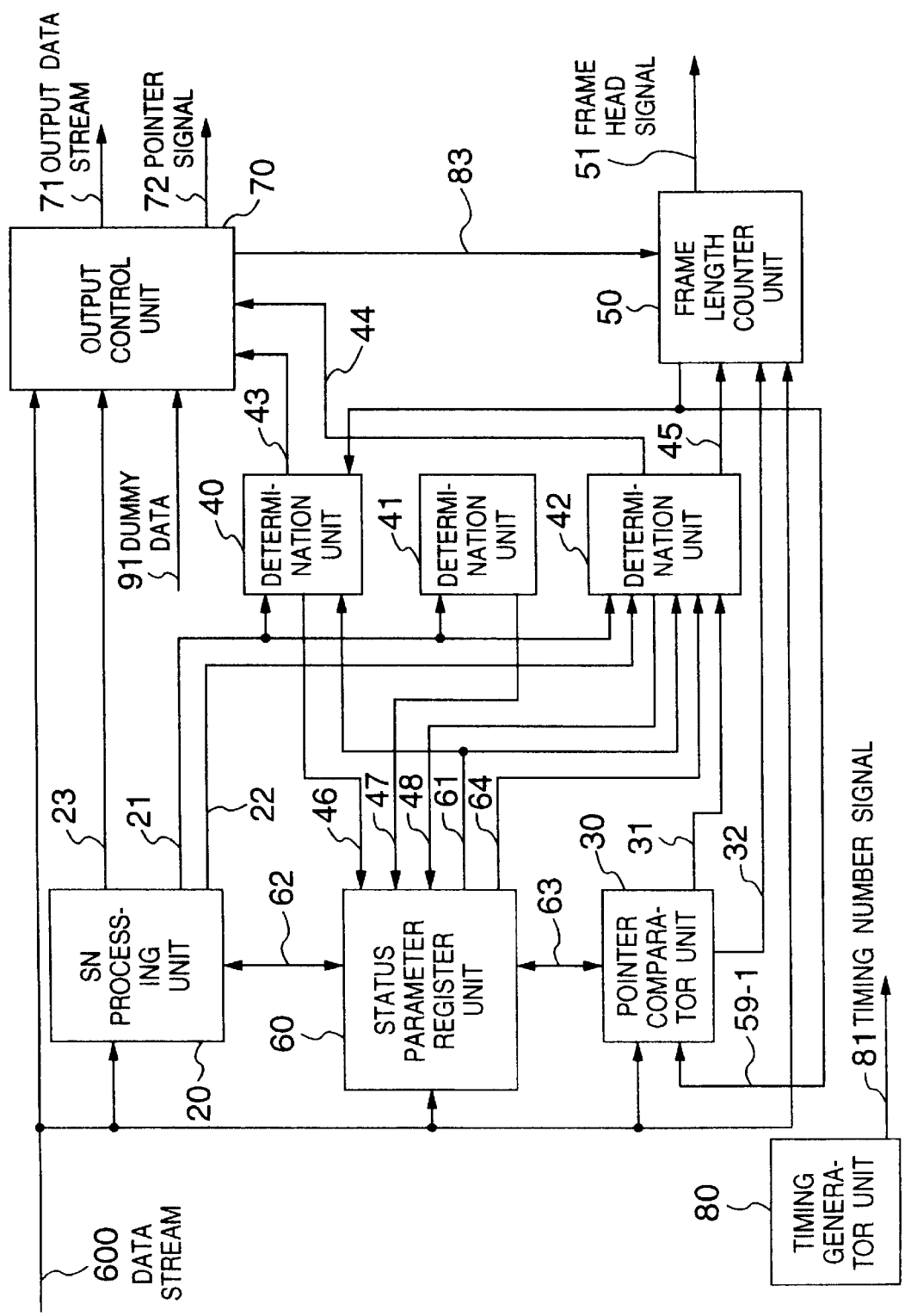
FIG. 1 is a block diagram illustrating the configuration of an embodiment of an AAL1 processing apparatus according to the present invention.

As illustrated in FIG. 1, the AAL1 processing apparatus is composed of a sequence number (SN) processing unit 20; a pointer comparator unit 30; determination units 40, 41, 42; a frame length counter unit 50; a status parameter register unit 60; an output control unit 70; and a timing generator unit 80. The AAL1 processing apparatus properly executes a variety of processing in accordance with a timing number signal 81 from the timing generator unit 80.

The operation of the AAL1 processing apparatus according to the present invention will be next described with reference to FIG. 2. First, each of received ATM cells from an ATM header analyzer unit (not shown), with connection information (CN) 620 added thereto, is inputted to the AAL1 processing apparatus at timing number 0. In the AAL1 processing apparatus, the connection information 620 is latched into the status parameter register unit 60 at timing number 0; an AAL1 header 610 into the SN processing unit 20 at timing number 6; and 1-byte data corresponding to the location of a pointer 612 into a pointer comparator unit 30 at timing number 7.

The status parameter register unit 60 recognizes a connection number from the latched connection information 620, and reads a status parameter associated with the connection from a status table 67 at timing number 4. The frame length counter unit 50 in turn reads a counter value from a counter table 56 (indicated by a reading operation 906 in FIG. 2).

The SN processing unit 20 executes SN processing using the status parameter and the AAL1 header latched at timing number 6. Then, the SN processing unit 20 completes the SN processing and outputs established SN values 21, 22 at a timing number 8. Similarly, the pointer comparator unit 30 utilizes the 1-byte data corresponding to the location of the pointer 612 latched at timing number 7 and the counter value to compare the pointer with the counter value. If the comparison result indicates unmatch, an unmatch signal 31 is outputted at timing number 8.

Next, the determination units 40, 41, 42 determine the validity of the result of the pointer comparison processing using the established SN values 21, 22, the unmatch signal 31, and the status parameter to, and output P-cell signals 43, 44 at timing number 9 if the validity of the result is determined.

The result of the pointer comparison processing for a cell having a pointer is determined as valid regardless of the comparison result match or unmatch. For 7 cells having no pointer, the pointer comparison processing itself is meaningless. In this case, the result of the comparison processing is determined as invalid.

The output control unit 70 holds a data stream for a period corresponding to three timing portions and outputs it with a delay. In this event, if the P-cell signals 43, 44 are outputted, the validity has been determined for the comparison of the pointer with the counter value, so that the output control unit 70 outputs a pointer signal 72 indicating that a pointer has existed at timing number 10. The frame length counter unit 50 outputs a frame head signal 51 indicative of the position of a frame head at the time the counter value reaches zero (corresponding to the frame head).

Next, operations performed by the respective components of the AAL1 processing apparatus will be described in greater detail.

Figure 3:
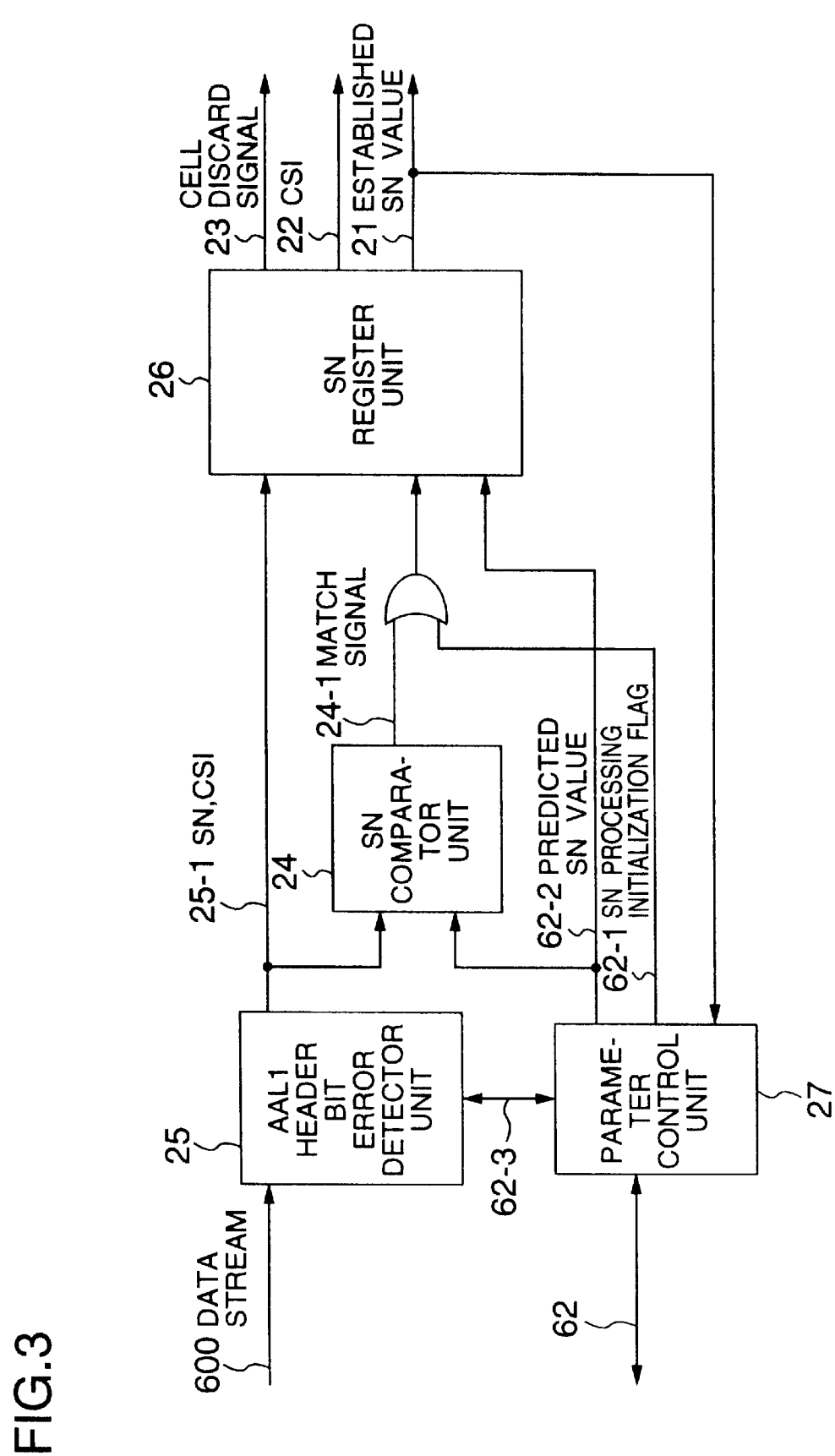
FIG. 3 is a block diagram illustrating the configuration of an embodiment of a sequence number processing unit according to the present invention.

First, an embodiment of the SN processing unit 20 will be described with reference to FIG. 3 which illustrates the configuration thereof. As illustrated, the SN processing unit 20 comprises an AAL1 header bit error detector unit 25; a SN comparator unit 24 for comparing a sequence number 25-1 with a previously predicted SN value 62-2 to confirm the order in which ATM cells have reached in order to monitor for cell loss and/or misinsertion; a SN register unit 26 for outputting an established SN value 21, CSI 22, and a cell discard signal 23 based on the detection/processing results from the respective units 25, 24; and a parameter control unit 27 which is supplied with a status parameter required for the SN processing from the status parameter register unit 60 to control the status parameter.

Now, the operation of each unit is described. When the AAL1 header bit error detector unit 25 confirms that an AAL1 header 610 latched therein is free from bit errors and when the SN comparator unit 24 confirms that no cell loss and/or misinsertion have been occurred, the SN comparator unit 24 initially outputs a match signal 24-1. In response to the match signal 24-1, a sequence number and a CSI 25-1 from the AAL1 header bit error detector unit 25 are held in the SN register unit 26. The sequence number 25-1 is outputted from the SN register unit 26 as an established SN value 21. If bit errors or cell loss and/or misinsertion have been detected in a received ATM cell, the match signal 24-1 is not outputted, and the SN register unit 26 outputs a predicted SN value 62-2 as the established SN value 21 as well as outputs the cell discard signal 23. The established SN value 21 from the SN register unit 26 is incremented (or updated) by one by the parameter control unit 27, and then used as a predicted SN value 62-2 for the next ATM cell. Also, on the ATM receiving side, a correct established SN value 21 is derived for the first ATM cell at an initial establishment of each connection so as to avoid cell discard. Specifically, if a SN initialization flag 62-1 is outputted from the parameter control unit 27 when the first ATM cell is received, the SN register unit 26 is normally operated to avoid cell discard as if the match signal 24-1 were outputted. In this way, the cell discard can be avoided by normally operating the SN register unit 26 when a connection is established, although no predicted SN value 62-2 exists.

Turning back to FIG. 1, the pointer comparator unit 30, which has the 1-byte data corresponding to the location of the pointer 612 latched therein, compares the 1-byte data with a counter value (the number of remaining byte data up to the frame head position) 59-1 from the frame length counter unit 50, on the assumption that the 1-byte data is a permanent pointer. In this event, the pointer comparator unit 30 first outputs an unmatch signal 31 when unmatch is successively indicated twice as the comparison results, under the control of an error history 63 from the status parameter register unit 60. The error history 63 is a bit for recording unmatch indicated by the pointer comparison, and is set to "1" when unmatch is indicated. If unmatch is indicated twice successively, a down counter 59 of the counter unit 50 is reset. As will be later described, the frame length counter unit 50 is provided with the down counter 59 which counts the number of remaining byte data up to the frame head position.

Figure 2:
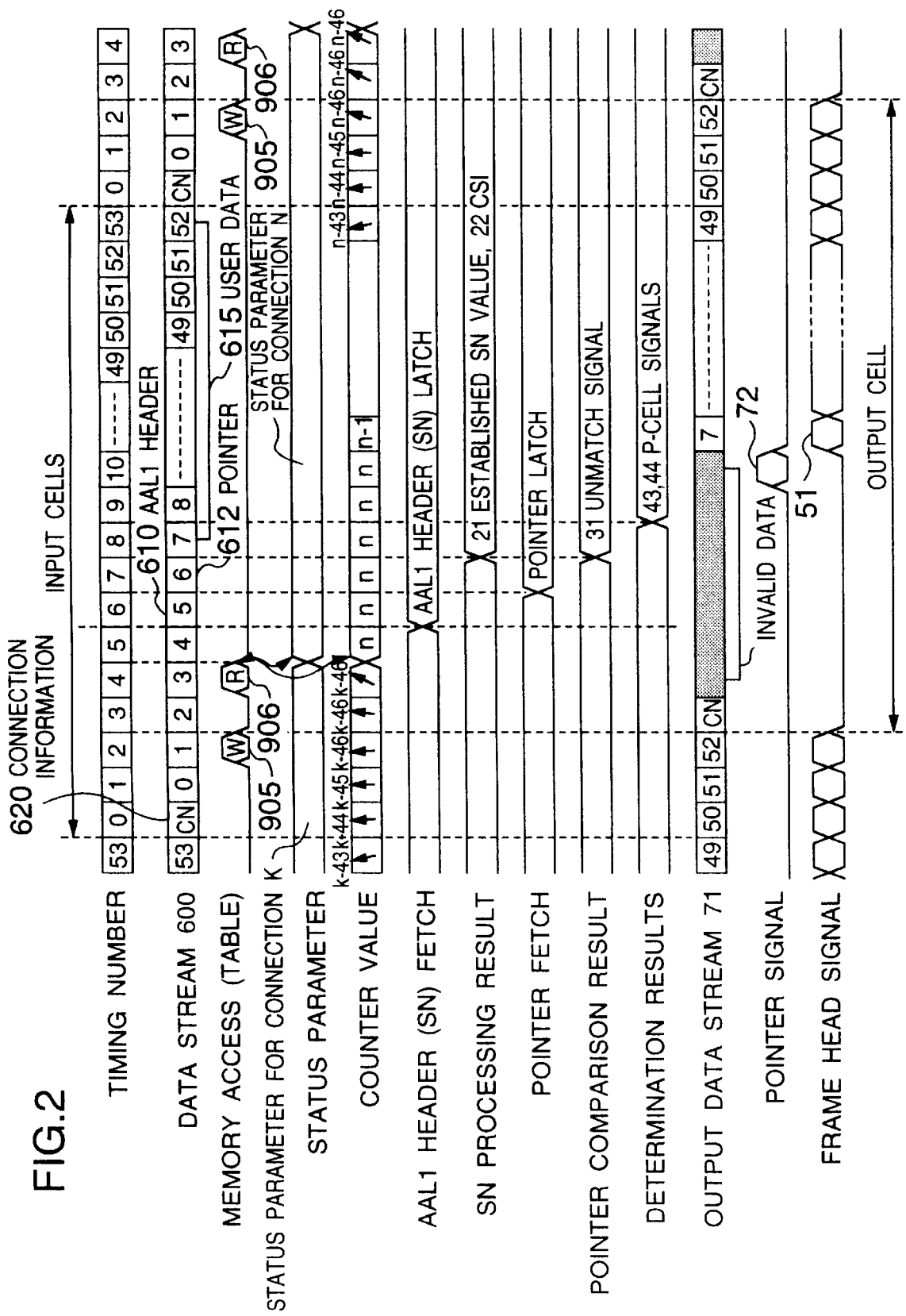
FIG. 2 is a timing diagram illustrating operation timing of the AAL1 processing apparatus of FIG. 1.

The determination units 40, 41, 42 are provided for determining whether or not the data latched at timing number 7 in FIG. 2 is a pointer as assumed and whether or not the pointer comparison result is valid. The determination unit 40 is applied when a cell is discarded in the SN processing based on determination of cell loss and/or misinsertion although an established SN value 21 associated with the cell is an even number, or when a cell is discarded due to bit errors in an associated AAL1 header 610. The determination unit 41, in turn, is applied when an established SN value is an odd number, particularly "7", while the determination unit 42 is applied when an ATM cell is determined to be correct and have an established SN value 21 being an even number.

The determination units 40–42 will be described in greater details with reference to FIGS. 4A–4C which illustrate the determination units 40–42, respectively.

Figure 4A:
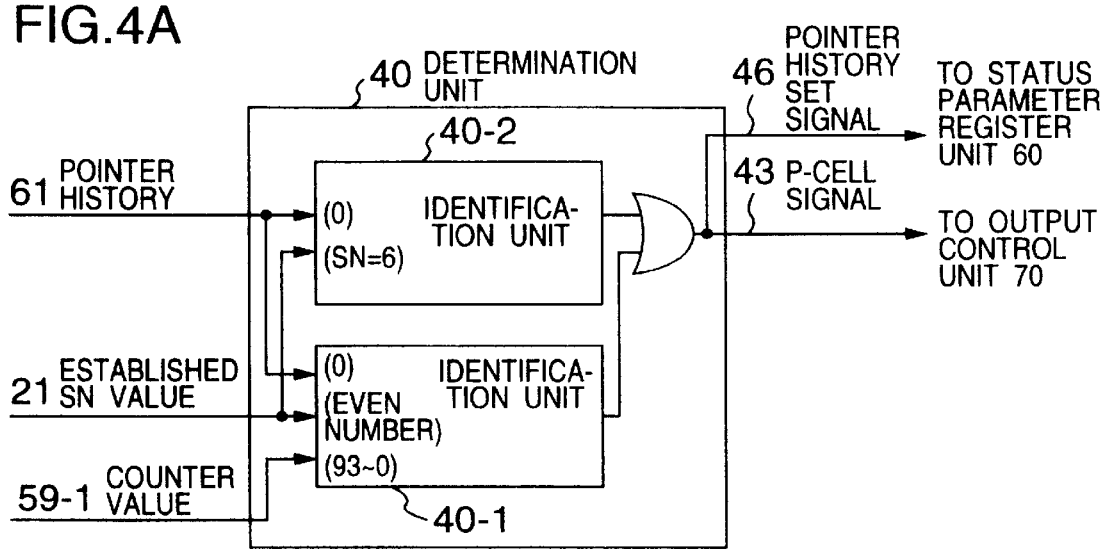
FIGS. 4A–4C are block diagrams respectively illustrating the configuration of a determination unit according to the present invention.

As illustrated in FIG. 4A, the determination unit 40, which comprises identification units 40-1, 40-2, corresponds to the case where an established SN value 21 is an even number, and an ATM cell is discarded.

Conditions necessary for identification in the identification unit 40-1 are that a counter value 59-1 indicative of the number of remaining bytes up to the frame head is in a range of 93-0, that a pointer history 61 indicating that a pointer has already reached during a cycle in which the SN value is updated from "0" to "7" is not detected yet, and that the established SN value 21 from the SN processing unit 20 is an even number. The pointer history 61 is a bit indicating whether or not a pointer is received once within eight cells, and is set to "1" when a pointer is received.

The identification unit 40-2 corresponds to the case where a frame length is larger than 375 (=47×8–1) bytes and a pointer is inserted, but a counter value 59-1 does not fall within the range of 93-0. Conditions necessary for identification in the identification unit 40-2 are that the pointer history 61 is not yet present, and that the established SN value 21 is "6". When any of the conditions above mentioned is satisfied, the result of the pointer comparison processing is regarded as valid, and a P-cell signal 43 is outputted to the output control unit 70, and a pointer history set signal 46 is outputted to the status parameter register unit 60. In this event, a dummy cell is inserted in the output control unit 70.

Figure 4B:
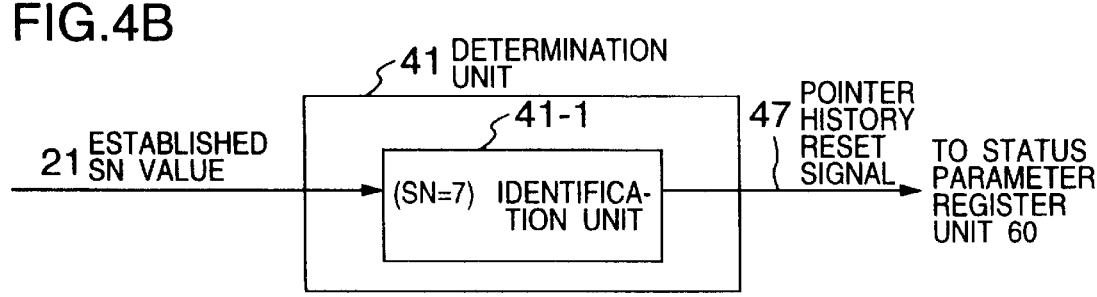

The determination unit 41 in turn is configured as an identification unit 41-1 for simply identifying the case where the established SN value 21 is "7", as illustrated in FIG. 4B. When the established SN value 21 is identified to be "7", a pointer history reset signal 47 is outputted to the status parameter register unit 60 to reset the pointer history 60. This operation is performed by the following reason. Since a pointer is inserted in any of even-numbered ATM cells only once during a cycle in which the sequence number is updated from "0" to "7", the pointer history 61 must be forcedly reset at the time the established SN value 21 has reached "7" in order to prepare for the processing in the next cycle.

Figure 4C:
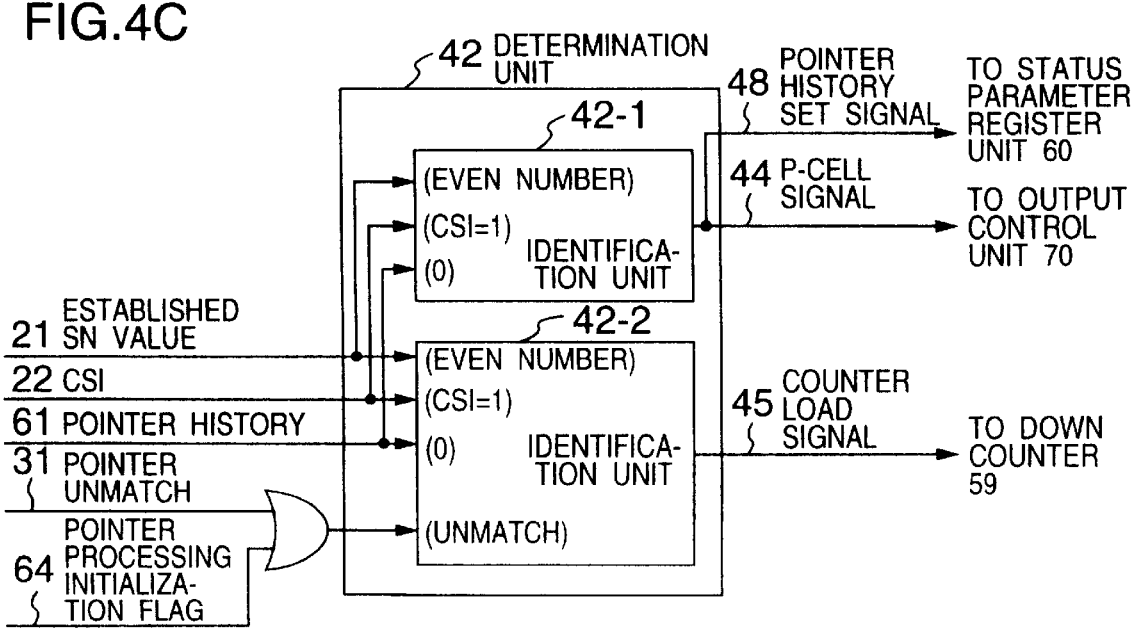

The determination unit 42, which is composed of identification units 42-1, 42-2 as illustrated in FIG. 4C, corresponds to the case where the SN processing has been correctly completed and an established SN value 21 is an even number.

Conditions necessary for identification in the identification unit 42-1 are that an established SN value 21 is an even number, that CSI 22 is "1", and that a pointer history 61 is not yet present. When the conditions are satisfied, the result of the pointer comparison processing is regarded as valid, and a P-cell signal is outputted to the output control unit 70 while a pointer history set signal 48 is outputted to the status parameter register unit 60.

The identification unit 42-2 in turn corresponds to the case where a pointer does not match a counter value 59-1 in the pointer comparison processing, where the down counter 59 (FIG. 6) is forcedly loaded with a pointer value 32. A condition is that the pointer comparator unit 30 outputs a pointer unmatch signal 31, in addition to the identification conditions in the identification unit 42-1. When the identification conditions in the identification unit 42-1 are satisfied, the result of the pointer comparison processing is regarded as valid, and a counter load signal 45 is outputted to the down counter 59 on 3 condition that the pointer unmatch signal 31 has been outputted from the pointer comparator unit 30. Also, in order to promptly and normally operate the down counter 59 after establishing a connection, when a pointer processing initialization flag 64 is outputted from the status parameter register unit 60 at the time the connection is established, the processing initialization flag 64 functions equivalently to the pointer unmatch signal 31 to forcedly load the pointer value 32 (FIG. 1) to the down counter 59 in response to the counter load signal 45.

Figure 5:
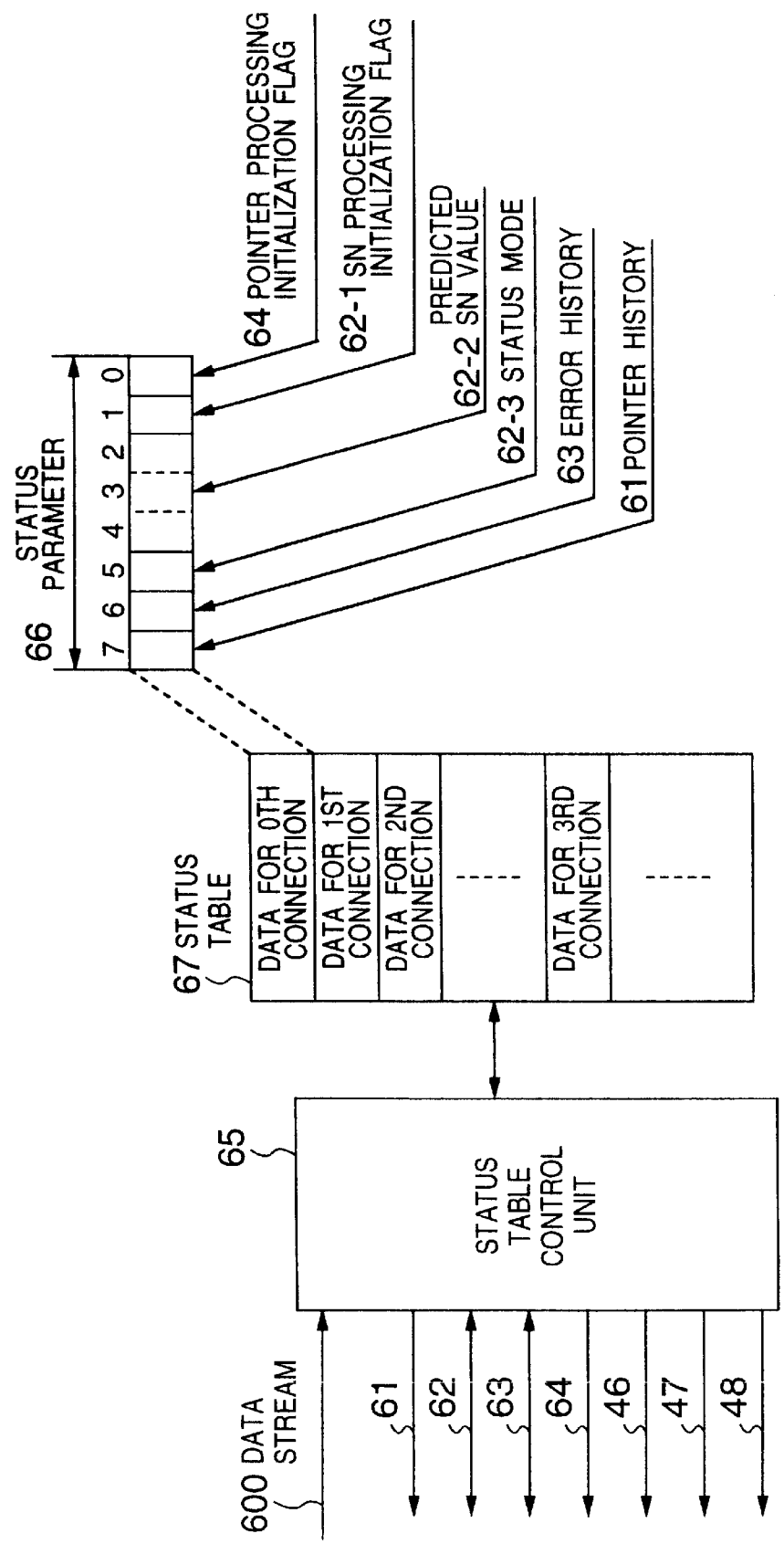
FIG. 5 is a diagram illustrating the configuration of an embodiment of a status parameter register unit according to the present invention.

The status parameter register unit 60 will now be described with reference to FIG. 5. The status parameter register unit 60 comprises a status table 68 for storing a variety of status parameters 66, as 1-byte data, required to operate the foregoing determination units 40, 41, 42, SN processing unit 20, and pointer comparator unit 30 for each header, i.e., for each connection; and a status table control unit 65 for controlling and updating the status table 67 for each connection.

The status parameter 66 includes the pointer processing initialization flag 64 (1 bit) and a SN processing initialization flag 62-1 (1 bit) for preventing the first received ATM cell from being discarded as an erroneous cell; a predicted SN value 62-2 for a next received cell (3 bits); a bit indicative of a receiver mode of operation used for calculating CRC (1 bit); an error history 63 for recording unmatch resulting from comparison of a pointer with a counter value (1 bit); and a pointer history 61 indicating that a pointer has been received once in eight cells (1 bit).

The connection information or connection number 620 (FIG. 2) is extracted from a data stream 600 at timing number 0 and latched in the status table control unit 65. This connection information 620 is decoded to derive an access address to the status table 67.

Since the SN processing unit 20 and the pointer comparator unit 30 are configured to operate in parallel, the SN processing initialization flag 62-1, the predicted SN value 62-2, a status mode 62-3 used by the SN processing unit 20 are all read from the status table 67 together with the error history 63, the pointer history 61, and the pointer processing initialization flag 64 used by the pointer comparator unit 30 in response to a read signal 906 (FIG. 2) at the same timing number 4, and then written into the status table 67 in response to a write signal 905 (FIG. 2) at the same subsequent timing number 2. It should be noted that the SN processing initialization flag 62-1 and the pointer processing initialization flag 64 should be previously set in order to prepare for the establishment of a connection, however, they are subsequently placed in a reset state after the SN processing and the pointer processing are once initialized.

Figure 6:
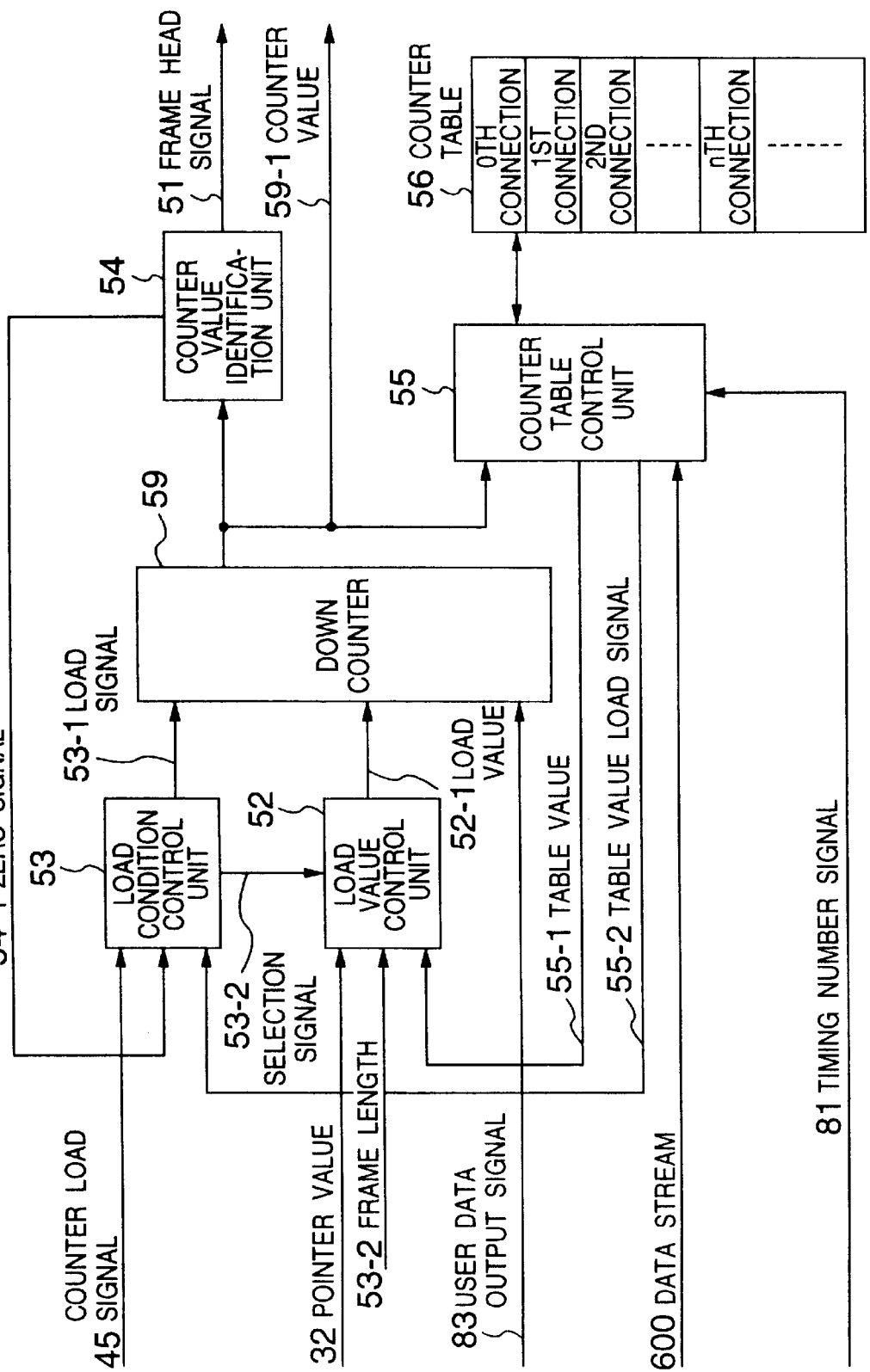
FIG. 6 is a block diagram illustrating the configuration of an embodiment of a frame length counter unit according to the present invention.
Figure 8A:
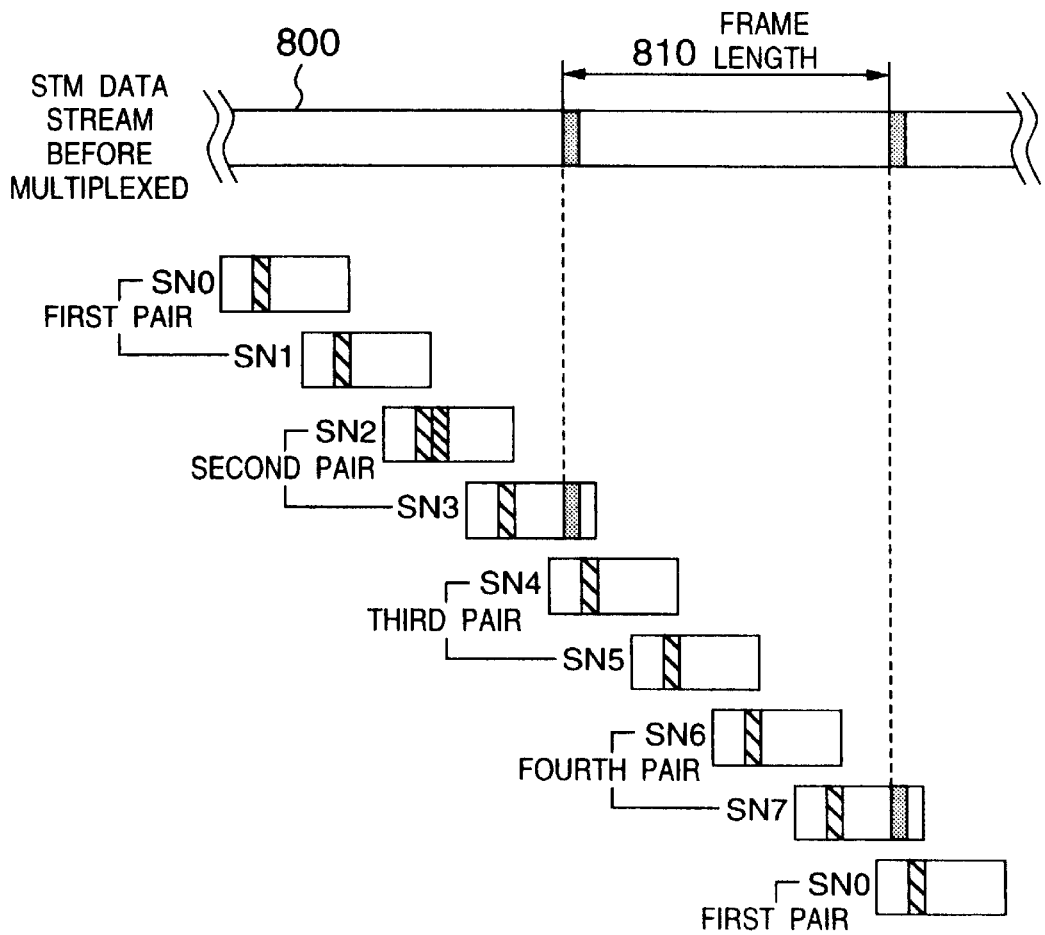
FIGS. 8A, 8B show how a STM frame is transformed into ATM cells.
Figure 8B:
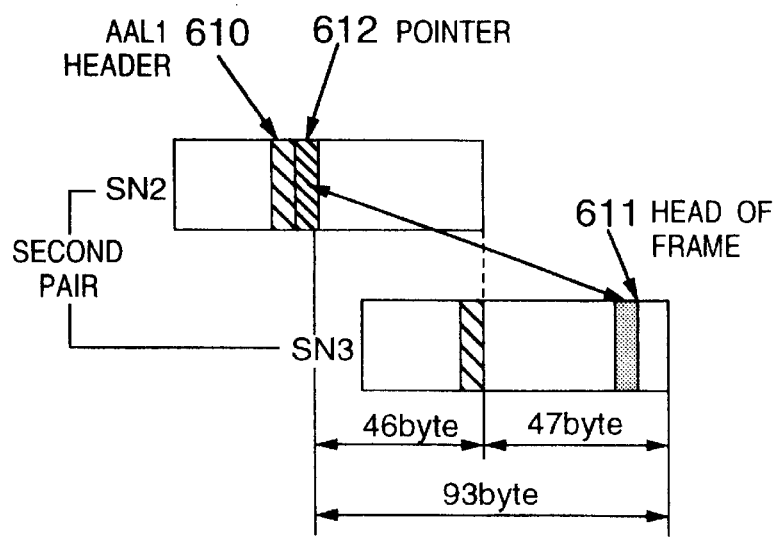

FIG. 6 illustrates in a block diagram form the configuration of the frame length counter unit 50. The frame length counter unit 50 comprises a down counter 59 for counting a frame length; a counter value identification unit 54 for monitoring the timing at which a counter value 59-1 reaches zero to output a frame head signal 51 and a zero signal 54-1; a load condition control unit 53 for controlling a load signal to the down counter 59; a load value control unit 52 for selectively controlling a load value to the down counter 59; a counter table 56 having a memory area divided into segments for respective connections for storing the counter value 59-1 as an updatable value; and a counter table control unit 55 for controlling the counter table 56.

The connection information 620 is extracted from the data stream 600 at timing number 0 and latched into the counter table control unit 55. Based on this connection information 620, a previous counter value of an associated connection is read from the counter table 56 as a table value 55-1 at timing number 4, and loaded into the down counter 59 in response to a table value load signal 55-2.

The down counter 59 counts down its counter value based on a user data output signal 83 from the output control unit 70 only while user data is being outputted in units of byte, and stores the counter value 59-1 in the counter table 56 at timing number 2 at which the output of the user data is terminated. If the counter value 59-1 reaches zero while the user data is being outputted, the frame head signal 51 is outputted from the counter value identification unit 54 since that timing indicates a frame head. For instance, when the zero signal 54-1 is generated, a frame length (fixed STM frame length) 52-2 is loaded into the down counter 59 as a load value 52-1 with the zero signal 54-1 serving as a load signal 53-1.

Finally, the output control unit 70 will be described as a component of the AAL1 processing apparatus. The output control unit 70 temporarily stores the data stream 600, and outputs connection information at timing number 3 and data from timing number 10 to timing number 2 as an output data stream 71 to a STM multiplexer unit. In this event, if the output control unit 70 is supplied with any of the P-cell signals 43, 44 from the determination units 40, 42, the output control unit 70 outputs a pointer signal 72 indicative of a pointer to the STM multiplexer unit at timing number 10.

Figure 9:
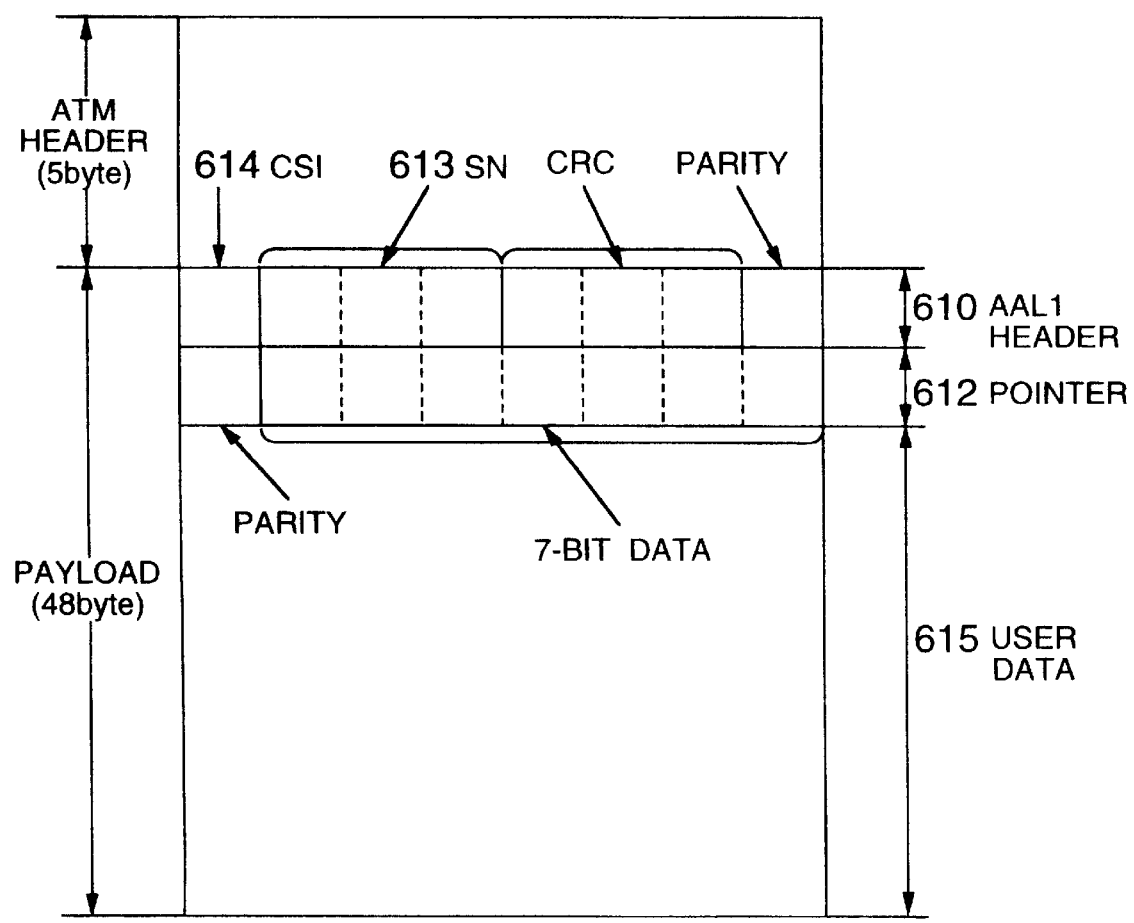
FIG. 9 is a diagram illustrating a format for an ATM cell.

Consequently, the output control unit 70 supplies the STM multiplexer unit with 46 bytes of user data when any of the P-cell signals 43, 44 is inputted thereto; with 46 bytes of dummy data when the P-cell signal 43 and the cell discard signal 23 are inputted thereto, and with 47 bytes of user data when any of the P-cell signals 43, 44 and the cell discard signal 23 is not inputted thereto (see FIG. 9).

Finally, general operations of the entire AAL1 processing apparatus and more specific operations of same will be described below in connection with a specific ATM cell taken as an example.

The general operations of the AAL1 processing apparatus is first discussed. Each of received ATM cells from an ATM header analyzer unit is sequentially inputted to the AAL1 processing apparatus, with connection information (CN) added to the head thereof, as illustrated in FIGS. 1, 2 as the data stream 600. In the AAL1 processing apparatus, each time a received ATM cell is inputted, the received ATM cell itself is temporarily stored in the output control unit 70, while the connection information added thereto is first latched into the status parameter register unit 60. The connection information is utilized as a read address to read a status parameter corresponding to the received connection information at timing number 4, and the read parameter is set to the SN processing unit 20, the pointer comparator unit 30, and the determination units 40, 41, respectively. Meanwhile, in the frame length counter unit 50, a counter value corresponding to the received connection is read from the counter table 56 (FIG. 6) based on the same received connection information, and loaded into the down counter 59. At this time, the processing state immediately after the preceding ATM cell having the same connection information is recovered for the received connection. In this way, currently incoming ATM cells can be subsequently processed with the processing continuity being maintained.

In the state mentioned above, an AAL1 header 610 containing a sequence number is subsequently latched into the SN processing unit 20, so that the SN processing unit 20 checks the latched AAL1 header 610 in terms of bit errors as well as cell loss and/or misinsertion. Immediately after the AAL1 header 610 is latched, data corresponding to the byte location immediately after the location of the AAL1 header 610, which is assumed to be a pointer value, is latched into the pointer comparator unit 30 which compares the pointer value with a counter value 59-1 from the down counter 59. After the SN processing and the pointer comparison processing have been completed, it is determined whether or not a pointer is actually inserted. If it is determined that a pointer is inserted as assumed, an unmatch signal 31 from the pointer comparator unit 30 is made valid, and the validity of the unmatch signal 31 is reflected to the output control unit 70 and the frame length counter unit 50. Conversely, if it is determined that no pointer is inserted, the unmatch signal 31 from the pointer comparator unit 30 is made invalid by the determination unit 42.

Until each of the foregoing processing is completed, the ATM cell is temporarily stored in the output control unit 70 for a predetermined time (a duration of three clocks in this embodiment). If the output control unit 70 is supplied with a P-cell signal 43 from the determination unit 40 or a P-cell signal 44 from the determination unit 42, the P-cell signal 43 or the P-cell signal 44 is outputted to the STM multiplexer unit as a pointer signal 72. The pointer signal 72 indicates that user data outputted to the STM multiplexer unit has 46 bytes due to a pointer inserted into the user data. Conversely, if the output control unit 70 is not supplied with the P-cell signal 43 or the P-cell signal 44, 47 bytes of the user data are outputted to the STM multiplexer unit. In the frame length counter unit 50, the down counter 59 counts the number of remaining bytes up to the a frame head in response to a down clock which may be a user data output signal 83 synchronized to data transfer to the STM multiplexer unit in byte by byte. At the time the counter value 59-1 reaches zero, a frame head signal 51 is outputted to the STM multiplexer unit. When a series of processing is finally completed for the ATM cell, the bits constituting the status parameter have also been updated in accordance with changes in the processing states of the respective units, so that the updated bits of the status parameter are collected and written into the status parameter register unit 60 at timing number 2 in order to prepare for the processing of the next ATM cell. Similarly, the counter value 59-1 of the down counter 59 is also saved in the counter table 56.

The general operation of the AAL1 processing apparatus has been described above. In the following, specific processing operations of the AAL1 processing apparatus will be described in connection with an inputted ATM cell having connection information set at "1", a sequence number being "3", and no pointer, i.e., an ATM cell having 47 bytes of user data, as an example. Based on latched connection information "1", a status parameter corresponding to the connection information "1" is read from the status table 67 in the status parameter register unit 60. On the other hand, in the frame length counter unit 50, a counter value 59-1 corresponding to the connection information "1" is read and loaded into the down counter 59, thus completing the preparation for processing the ATM cell. When the AAL1 header 610 is latched into the SN processing unit 20 in this state, the actual sequence number (SN) is compared with a predicted SN value as the status parameter, subsequent to a check for bit errors, to determine the presence or absence of cell loss and/or misinsertion in the ATM cell. If no bit errors are detected and the predicted SN value is "3", the ATM cell is determined to be correct. In addition, subsequent to the AAL1 header 610 latched into the SN processing unit 20, data corresponding to the byte location immediately after the location of the AAL1 header 610 is assumed to be a pointer value, and the pointer value is latched into the pointer comparator 30 and compared with the counter value 59-1 indicative of the number of remaining bytes up to the frame head. In this event, since the pointer value is not an actual one, the pointer comparator unit 30 generates in most cases a pointer unmatch signal 31 as a result of the comparison except for very rare exceptions (the assumed pointer value happens to be the same as an actual one). However, since the SN processing and the pointer comparison are executed in parallel, it is still unknown whether or not a normal pointer is actually inserted in the ATM cell because it has not been revealed whether the sequence number is odd or even and whether the CSI indicates the presence or absence of the pointer.

As described above, while the pointer unmatch signal 31 is generated from the pointer comparator unit 30, the determination units 40, 42 determine whether or not the pointer unmatch signal 31 is generated as a result of comparison with a normal pointer value. Within the determination units 40, 42, the determination unit 40 determines the validity of the result of pointer comparison for an abnormal ATM cell having an even established SN value 21, so that the determination unit 40 is excluded from the processing executed for the ATM cell in this example. The determination unit 42 is also excluded from the processing executed in this example for the ATM cell assumed to have the established SN value 21 being "3", since the determination unit 42 determines the validity of the result of pointer comparison for a normal ATM cell having an even established SN value 21. Thus, the pointer unmatch signal 31 from the pointer comparator unit 30 is made invalid by the determination unit 42. Consequently, the output control unit 70 outputs 47 bytes to the STM multiplexer unit as user data since any of the P-cell signals 43, 44 is applied thereto so that the associated ATM cell is determined to have no pointer. In the frame length counter unit 50, on the other hand, the down counter 59 counts down its counter value by 47. After terminating the above processing, the bits constituting status parameter distributively set in the pointer comparator unit 30, the determination units 40, 42, the SN processing unit 20, and so on are collected and written into the status table 67 in the status parameter register unit 60 as corresponding to the connection information "1". In this event, the predicted SN value 62-2 is of course written as "4" since the just processed ATM cell has a sequence number being "3". Similarly, the counter value of the down counter 59 is saved in the counter table 56 as a value calculated by subtracting "47" from the value read from the counter table 56.

Assume next that an ATM cell having connection information set to "2", a sequence number being zero, and a pointer, i.e., an ATM cell having 46 bytes of user data, is inputted without pointer history. Based on the latched connection information "2", a status parameter corresponding to the connection information "2" is read from the status table 67 in the status parameter register unit 60. In the frame length counter unit 50, on the other hand, a counter value corresponding to the connection information "2" is read and loaded into the down counter 59, thus completing the preparation for processing the ATM cell. When the AAL1 header 610 is latched into the SN processing unit 20 in this state, the sequence number is compared with a predicted SN value to determine the presence or absence of cell loss and/or misinsertion in the ATM cell subsequent to a check for bit errors. If no bit errors are detected and the predicted SN value is "0", the ATM cell is determined to be normal. Continuing the description on the assumption that the ATM cell is normal, after the AAL1 header 610 has been latched into the SN processing unit 20, data corresponding to a byte location immediately after the location of the AAL1 header 610 is assumed to be a pointer value, and the pointer value is latched into the pointer comparator unit 30 and compared with the counter value 59-1 indicative of the number of remaining bytes up to a frame head. Since a normal pointer is inserted in the ATM cell in this example, the pointer value normally matches the counter value 59-1 so that the pointer unmatch signal 31 is not generated. However, the description is continued below, assuming herein that the down counter 59 suffers from a fault and the pointer unmatch signal 31 is generated.

Subsequently, since the pointer comparator unit 30 generates the pointer unmatch signal 31 similarly to the aforementioned example, the determination units 40, 42 determine whether or not the pointer unmatch signal 31 is generated as a result of comparison with a normal pointer value. Since the ATM cell in this example is inputted without pointer history, the ATM cell is not subjected to the processing in the determination unit 40 but is subjected to the processing in the determination unit 42. Moreover, since the pointer unmatch signal 31 has been actually generated, not only the P-cell signal 44 and the pointer history set signal 48 but also the counter load signal 45 have all been generated. Consequently, the output control unit 70 outputs the pointer signal 72 and 46 bytes of user data to the STM multiplexer unit since the P-cell signal 44 is applied thereto to indicate that the associated ATM cell is determined to have a pointer. In the frame length counter unit 50, on the other hand, the down counter 59 is loaded with the pointer value 32 as a counter value and counts down this counter value by 46. After terminating the above processing, the bits constituting status parameter distributively set in the pointer comparator unit 30, the determination units 40, 42, the SN processing unit 20, and so on are collected and written into the status table 67 in the status parameter register unit 60 as corresponding to the connection information "2". In this event, the predicted SN value 62-2 is of course written as "1", while the pointer history is written as "set". Similarly, the counter value of the down counter 59 is saved in the counter table 56 as a value equal to the pointer value 32 minus "46".

The data stored in the status table 67 is read and set to the respective processing units when a cell having the same connection information is again received.

While the present invention has been described in connection with specific embodiments, it will be understood that the present invention is not limited to the embodiments disclosed herein, and encompasses a variety of modifications which may fall under the appended claims.

We claim:

1. An AAL1 processing method for use in an AAL1 processing apparatus in a cell disassembly apparatus for transforming ATM cell multiplex signals from an ATM network into STM multiplex signals to transfer the STM multiplex signals to a STM network, comprising the steps of:

performing sequence number processing based on a sequence number contained in an AAL1 header of each of received ATM cells;

performing pointer comparison processing in parallel with said sequence number processing on the assumption that a pointer is inserted in each of the received ATM cells;

determining the validity of the result of pointer comparison processing based on the result of said sequence number processing; and controlling data outputted to a STM multiplexer unit and output timing of said data based on the result of said step of determining.

2. An AAL1 processing method according to claim 1, wherein said step of determining includes the step of classifying a received cell into a normal cell having an even-numbered sequence number and a cell having an odd-numbered sequence number, and a case in which a cell having an even-numbered sequence number is lost to determine the validity of the result of the pointer comparison processing.

3. An AAL1 processing method according to claim 1, further comprising the steps of:

before executing said each step, reading a status parameter indicative of a processing history of the preceding cell having the same connection number as a received cell from a group of status parameters corresponding to the connection number, said status parameters being previously stored in a memory, as being updatable corresponding to the connection number added to each ATM cell; and setting said read status parameter to each processing unit which executes an associated one of said steps.

4. An AAL1 processing method according to claim 3, wherein said step of reading a status parameter includes the step of reading said status parameter as one word.

5. An AAL1 processing method according to claim 3, wherein said step of reading a status parameter includes the step of reading a status parameter including a sequence number processing initialization flag and a pointer processing initialization flag for enabling a normal operation from an initial state.

6. An AAL1 processing apparatus for use in a cell disassembly apparatus comprising:

sequence number processing means;

pointer comparing means operable in parallel with said sequence number processing means on the assumption that a pointer is inserted in each of received ATM cells;

means for determining the validity of the result of said pointer comparing means; and means for controlling data outputted to a STM multiplexer unit based on the result of said means for determining.

7. An AAL1 processing apparatus according to claim 6, further comprising:

means for storing the latest processing history for each connection number added to an ATM cell as a status parameter; and means operable when a cell is received for reading said status parameter in accordance with a connection number of the received cell to perform initial setting for said sequence number processing means, said pointer comparing means, and said means for determining.

8. An AAL1 processing apparatus according to claim 6, wherein said means for determining includes:

first determination means for determining whether or not a cell having an even-numbered sequence number is lost;

second determination means for determining whether or not a received cell has an odd-numbered sequence number; and third determination means for determining whether or not a received cell has an even-numbered sequence number and whether or not said cell is a correct cell.

9. An AAL1 processing apparatus according to claim 6, wherein said means for storing stores, as said status parameter, at least a pointer processing initialization flag and a SN processing initialization flag for normally executing the first pointer comparison processing and sequence number processing upon establishing a connection, a value indicative of a predicted sequence number of a cell to be next received having the same connection number, an error history for recording unmatch in pointer comparison, and a pointer history indicating whether or not a pointer has been received once in eight cells.

10. An AAL1 processing apparatus according to claim 6, wherein said means for performing initial setting includes means for retrieving said pointer processing initialization flag and said SN processing initialization flag from said status parameter upon establishing a connection to set said flags in said sequence number processing means, said pointer comparing means, and said means for determining.

11. An AAL1 processing apparatus for use in a cell disassembly apparatus, comprising:

status parameter holding means for storing status parameters corresponding to connection numbers for indicating a processing history of the preceding cell for each of the connection numbers added to each of ATM cells, said status parameters being stored as updatable;

means for reading a status parameter corresponding to a connection number acquired when an ATM cell is inputted from said status parameter holding means based on the connection number and for setting said status parameter in each processing means in said AAL1 processing apparatus to recover a processing state of the ATM cell having said connection number;

sequence number processing means for confirming the order of sequence numbers stored in AAL1 headers of respective received ATM cells based on a status parameter corresponding to the connection number to monitor each of the received ATM cells for cell loss and/or misinsertion;

pointer comparing means, on the assumption that a pointer is inserted in each of the received ATM cells, for comparing a value of said pointer with the number of remaining bytes up to the head of a frame based on the status parameter corresponding to the connection number, said pointer comparing means operable in parallel with said sequence number processing means;

determination means for determining whether or not a processing result in said pointer comparing means is valid based on said sequence number processing means and the status parameter corresponding to the connection number read from said status parameter holding means;

frame length counting means for counting the number of remaining bytes up to the head of a STM frame to output a frame head signal; and output control means for controlling data to the outside of said AAL1 processing apparatus and output timing of said data based on a determination result of said determination means.

12. An AAL1 processing apparatus according to claim 11, wherein said determination means includes:

first determination means for determining whether or not a cell having an even-numbered sequence number is lost;

second determination means for determining whether or not a received cell has an odd-numbered sequence number; and third determination means for determining whether or not a received cell has an even-numbered sequence number and whether or not said received cell is normal.

13. An AAL1 processing apparatus according to claim 11, wherein said status parameter holding means includes, as said status parameter, at least a pointer processing initialization flag and a SN processing initialization flag for normally executing the first pointer comparison processing and sequence number processing upon establishing a connection, a value indicative of a predicted sequence number of a cell to be next received having the same connection number, an error history for recording unmatch in pointer comparison, and a pointer history indicating whether or not a pointer has received once in eight cells.

14. An AAL1 processing apparatus according to claim 11, wherein said means for recovering a processing state includes means for retrieving said pointer processing initialization flag and said SN processing initialization flag from said status parameter upon establishing a connection to set said flags in said each processing means.

\* \* \* \* \*